Patented June 7, 1927.

1,631,823

UNITED STATES PATENT OFFICE.

JOSEF JANNEK, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY.

PURIFYING GASES.

No Drawing. Application filed June 8, 1925, Serial No. 35,781, and in Germany June 16, 1924.

The present invention has for its object a process for the purification of gases and more especially from iron carbonyl the presence of which even in small traces is most undesirable for various purposes for which the gases may be used.

I have found that gases contaminated with iron carbonyl vapors can be purified by passing them with a gaseous admixture of a body capable of chemically acting on iron carbonyl, over a porous active mass. As examples of suitable chemically acting bodies I mention oxygen, chlorin, hydrogen chlorid, phosgene, while as active masses any sort of active carbon, silica gel and similar bodies may be used. The iron carbonyl is converted into iron oxid or into other non-volatile iron compounds which generally are retained by the active mass.

A modification of the process consists in passing the gas containing iron carbonyl and the chemically acting body, or a gas containing the said body, over the active mass in an alternating way. The iron carbonyl in this case is first absorbed by the active mass and is then decomposed by the chemically acting body.

When the active mass is loaded or substantially saturated with the reaction product of iron carbonyl and the chemically acting body and consequently the efficiency of the active mass has become exhausted. the iron compounds taken up by it can be extracted by means of dilute acids or other chemicals, or by leaching with water, in some cases, and after drying the material will again be active.

The following examples serve to illustrate further how the invention may be carried out in the practice but the invention is not limited to these examples.

Example 1.

A gas carrying a small amount of iron carbonyl vapour is mixed with a small amount of air, sufficient for the oxidation of the iron carbonyl, through a layer of active carbon. The iron carbonyl is catalytically oxidized with an evolution of heat in a thin part of the active carbon layer next to the entrance of the gas. When the zone of the reaction has reached the end of the active carbon bed the latter is nearly exhausted and is then regenerated by treatment with acid, washing and drying.

Example 2.

Water gas containing iron carbonyl is passed through a layer of active carbon which retains the iron carbonyl. When the carbon is saturated, a current of air is passed through by means of which the carbonyl is oxidized to iron oxid. Such alternating shifts of saturating and oxidizing may be repeated until the absorption power of the carbon becomes insufficient. The carbon is then revivified by treatment with an acid which treatment may, if desired, be preceded or followed by a treatment with steam.

Example 3.

A gas contaminated with iron carbonyl is mixed with a little hydrogen chlorid gas and passed through a layer of active carbon where the carbonyl is decomposed with a formation of ferric chlorid. When the carbon is exhausted, the ferric chlorid can be extracted with water. When dry, the carbon can be used again.

What I claim is:

1. The process of removing iron carbonyl vapors from gases containing the same which consists in passing the said gases over active absorbing material and acting on the latter with a substance chemically reacting on iron carbonyl until the absorbing mass is substantially saturated with the reaction product of iron carbonyl and the chemically reacting body and then regenerating the mass.

2. The process of removing iron carbonyl vapors from gases, which consists in passing the gases in conjunction with a substance capable of decomposing iron carbonyl in about the amount required for such decomposition over active absorbing material until the absorbing mass is substantially saturated with the reaction product of iron carbonyl and the chemically reacting body and then regenerating the mass.

In testimony whereof I have hereunto set my hand.

JOSEF JANNEK.